[19] United States Patent
Remson

[11] Patent Number: 5,222,102
[45] Date of Patent: Jun. 22, 1993

[54] DIGITAL PHASED LOCKED LOOP APPARATUS FOR BIPOLAR TRANSMISSION SYSTEMS

[75] Inventor: Joseph D. Remson, Phoenix, Ariz.

[73] Assignee: ROLM Company, Santa Clara, Calif.

[21] Appl. No.: 706,126

[22] Filed: May 28, 1991

[51] Int. Cl.$^5$ .............................................. H04L 25/49
[52] U.S. Cl. ...................................... 375/20; 375/117
[58] Field of Search ................. 375/7.8, 17.20, 106.17; 370/84, 97, 105.1, 119; 341/56

[56] References Cited

U.S. PATENT DOCUMENTS

| 4,408,325 | 10/1983 | Grover | 370/119 |
| 5,014,270 | 5/1991 | Sillere | 375/20 |
| 5,040,190 | 8/1991 | Smith et al. | 375/7 |

FOREIGN PATENT DOCUMENTS

WO8505234  11/1985  PCT Int'l Appl. .................... 375/20

Primary Examiner—Stephen Chin

[57] ABSTRACT

Apparatus generates synchronized timing for both the up and down links of a transmission path such as a telephone line, which telephone line carries bipolar data. The apparatus operates to detect a Start of Frame signal which signal constitutes a known violation in the bipolar data. This Start of Frame signal is applied to a series of dividers and decoders which operate in conjunction with an oscillator to produce a series of timing signals related to the Start of Frame signal. A selected one of the timing signals is utilized to synchronize the up link apparatus to the down link apparatus. In this manner the counter circuitry which is employed in both the down link side and the up link side is used to accumulate any timing difference between the data source and the data receiver. After a number of bit periods have passed, the timing signals generated will move with respect to a data bit, depending on whether the clock at the transmitting end is slower or faster than the clock at the receiving end. The operation causes the receiving end to synchronize with the transmitting end.

21 Claims, 9 Drawing Sheets

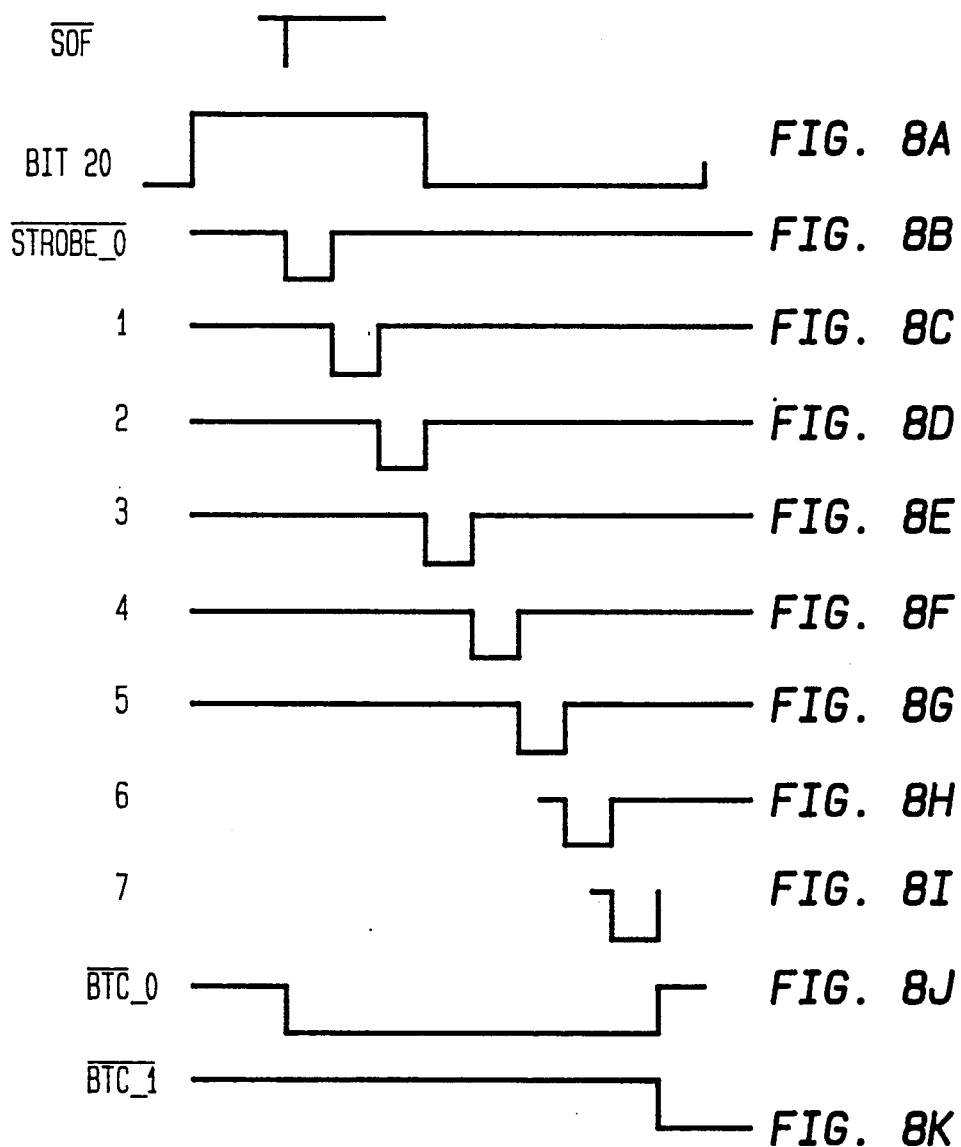

FIG. 9A
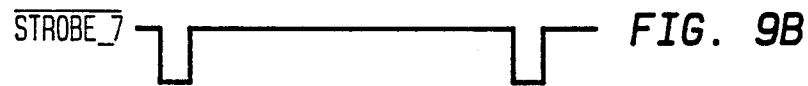
FIG. 9B
FIG. 9C
FIG. 9D
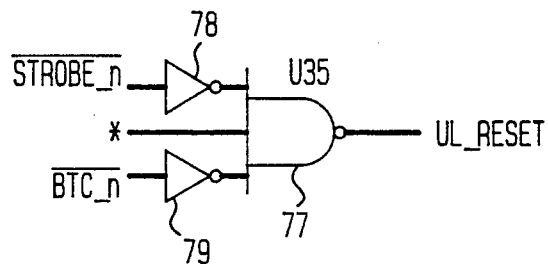
* USE TENCT FOR BITS 0-9
* USE $\overline{TENCT}$ FOR BITS 10-19
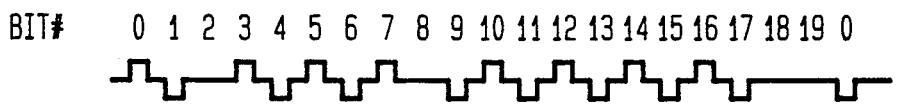
$\overline{SOF}$ — FIG. 9E
$\overline{UL\_RESET}$ — FIG. 9F
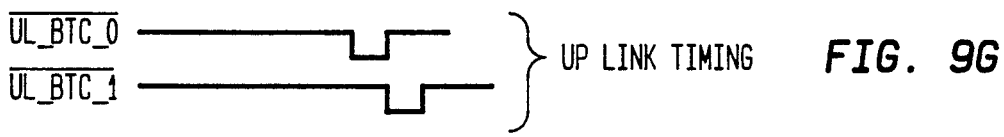
} UP LINK TIMING  FIG. 9G

DIGITAL PHASED LOCKED LOOP APPARATUS FOR BIPOLAR TRANSMISSION SYSTEMS

RELATED APPLICATIONS

The following applications are of general interest to the concepts to be described below. See "Apparatus for Detecting the Start of Frame in Bipolar Transmission Systems", Ser. No. 07/642,262 filed on Jan. 16, 1991. See Also Pa Application entitled "Apparatus for Converting an Alternate Mark Inversion Signal to Unipolar Signals", Ser. No. 07/635,051 filed on Dec. 28, 1990 both in the name of the inventor herein and assigned to the assignee herein.

FIELD OF THE INVENTION

This invention relates to a phased locked loop employing digital circuits and, more particularly, to an apparatus and method for generating congruent timing and control in a remote device utilizing the data transmitted from a host system.

As one will understand, whenever digital information is transmitted from one place to another, a timing reference or clock is needed to control the transfer. The clock specifies when to sample the incoming signal to decide which data value was transmitted. The optimum sample of times usually corresponds to the middle of the transmitted pulses. Thus, for optimum detection, the sample clock must be synchronized to the pulse arrival times. In general, the generation of a local timing reference for detecting the digital signal is not difficult. Thus there are many prior art references which discuss all types of sample clocking as well as the locking of the receiver to the transmitter in various digital systems. The problems can increase in complexity when a number of digital transmission links and switches are interconnected to form a network. Thus in such a situation not only must the individual elements in a network maintain internal synchronization, but also certain network-wide synchronization procedures must be established before the individual subsystems can interoperate properly. Thus the need for some form of synchronization is required and this is not unique to digital networks. As one can understand, in certain types of systems such as telephone switching systems, economics and simplicity in regard to synchronization is extremely important. As one can ascertain, each line in a telephone system is associated with a line circuit. Since such systems can have an extremely large number of subscribers, each of which has a line circuit there is a need for economical design. Hence, in order to provide synchronization, one must do so in an economical and simple way.

The present system concerns synchronization between a remote device and a local device where data is transmitted and received utilizing an alternate mark inversion signal (AMI). As one can ascertain, there are numerous line codes that are specifically designed to not contain DC energy and thereby be unaffected by DC removal. One example of such a line code is a bipolar coding which solves the DC wander problem by using three levels to encode binary data. Specifically, a logic "0" is encoded with "0" voltage while a logic "1" is alternately encoded with positive and negative voltages. Hence, the average voltage level is maintained at "0" to eliminate DC components in the signal spectrum. Since bipolar coding uses alternate polarity pulses for encoding logic 1's", it is also referred to as alternate mark inversion (AMI). A mark is a term arising from telegraphy to refer to the active or "1" state of a level encoded transmission line.

Bipolar coding is the basic line coding procedure used in many telephone systems as, for example, by T-1 lines in the telephone network. Essentially, rather than use the full pulse period, T-1 lines use a 50% duty cycle pulse to encode each logic "1". 50% duty cycle pulses were selected to simplify timing recovery in the regenerative repeaters of a T-1 line. A great deal of work has been done in regard to bipolar codes. Because a bipolar code uses alternating polarities for encoding "1's", strings of "1's" have strong timing components. However, a string of "0's" contains no timing information and therefore must be precluded by the source. Alternate mark inversion systems are widely employed in telephony. As one can understand, in these transmission systems, frames are used as a means of setting up communication channels. Digital data is usually transmitted serially and divided into frames, which are of a fixed number of bits in length. Frames are further subdivided into fields. Each field represents an independent communication channel. The least number of fields within a frame is two, one field for framing and the other field for containing data. The least number of bits per field is one. The format of the data in each field can be independent. One field may be in a HDLC format, and in another field it may be encrypted in a custom format. In an AMI system, frames are delineated by intentionally violating a characteristic of the modulation. See, for example, the above copending application entitled "Apparatus for Detecting the Start of Frame in Bipolar Transmission Systems". A violation in AMI modulation occurs when the polarity of the pulses remains the same for two or more logical "1's" occurring in succession but not necessarily consecutively. The violation can occur from bits above or below the logical "0" reference and is a function of the number of logical "1" bits contained in a frame. In order to afford synchronization as will be explained, the present system tests the status of the incoming data based on the polarity relative to the logic "0" level. The incoming data signal is transformed into three unipolar logic output signals. They are P_DATA which is positive with respect to the logic "0" reference, N_DATA which is negative to the logic "0" reference, and R_DATA which is the ORed combination of P_DATA and N_DATA. This aspect of the AMI signal is well known and reference is made to the above-noted application entitled "Apparatus for Converting an Alternate Mark Inversion Signal to Unipolar Signals". That application fully describes how the AMI signal is converted into the three signals indicated above and is deemed to be part of the present disclosure.

It is, therefore, an object of the present invention to provide a means to generate congruent timing and control in a remote device by means of data transmitted from a host system.

It is a further object of the present invention to detect the start of frame and to utilize the detection to lock or synchronize the two systems together.

SUMMARY OF THE INVENTION

Apparatus for synchronizing an up link side of a transmission path with a down link side of said transmission path, said transmission paths accommodating bipolar data wherein one binary state is alternately encoded with positive and negative polarity pulses, each pulse of a given duration and the other binary state is encoded with a zero or reference level and wherein a violation of said encoding occurs when the polarity level of said pulses remains the same for two or more successive pulses wherein said violation may constitute a Start of Frame (SOF) signal, comprising means responsive to data on said down link side for detecting said violation indicative of said SOF signal; means responsive to said SOF signal for generating a plurality of timing signals synchronized to said SOF signal but delayed one from the other by a specified duration; means responsive to a selected one of said timing signals to generate a new signal corresponding to said SOF signal; and means coupled to said up link side and responsive to said new signal to synchronize data on said up link side to said new signal.

BRIEF DESCRIPTION OF THE FIGURES

FIG. 8 consists of FIGS. 8A to FIG. 8K are series of waveforms useful in explaining the operation of the circuit of FIG. 6.

FIG. 9 consists of FIGS. 9A to 9G with FIGS. 9A to 9C constituting a series of waveforms, and FIG. 9D constituting a gate diagram necessary to generate the reset signal according to this invention, with FIGS. 9D to 9G constituting a series of waveforms necessary to explain operation of this invention.

Figure 7:
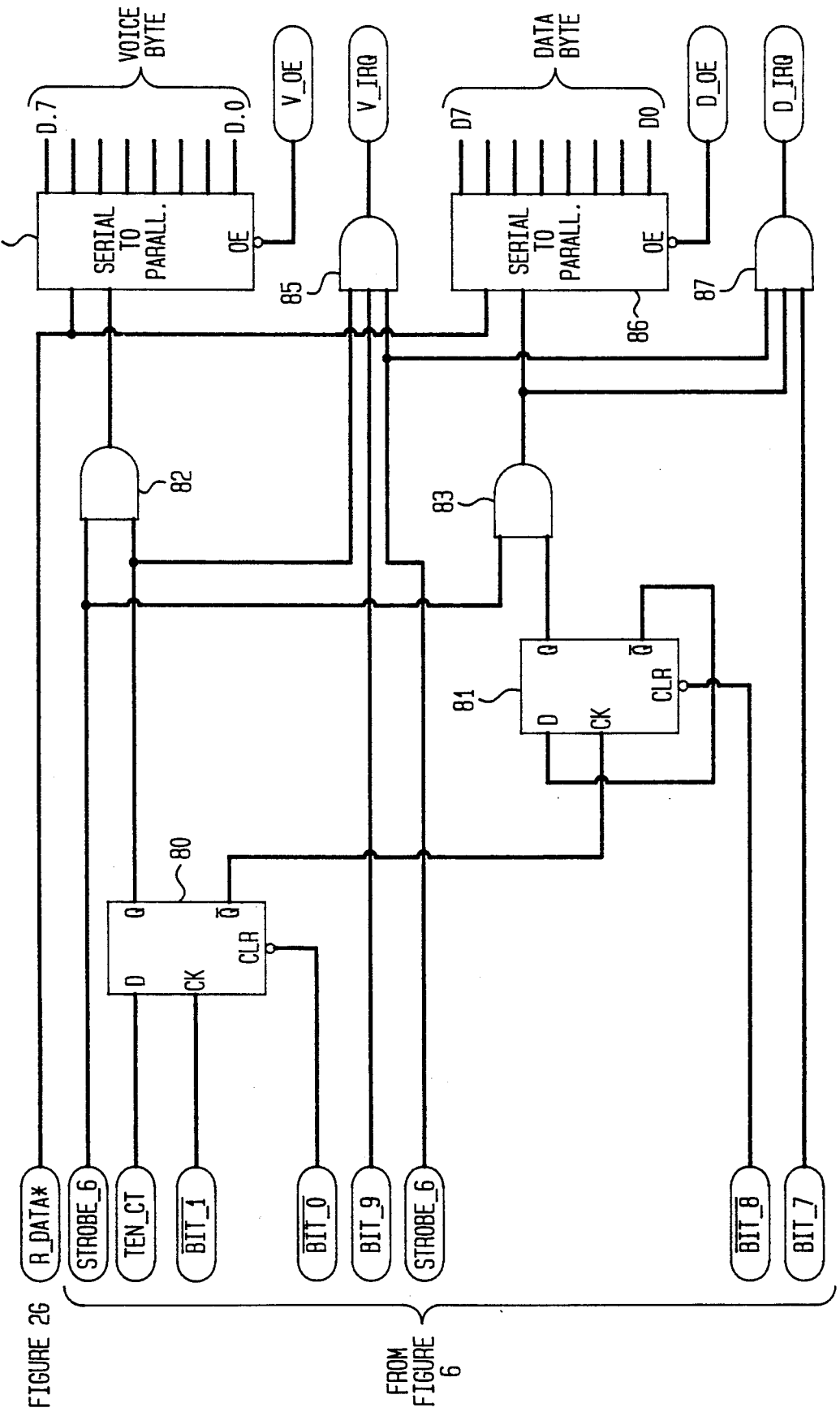
FIG. 7 is a detailed block diagram Of a format circuit according to this invention.

It is noted that the up link format circuit which is not shown can be the same as the down link format circuit shown in FIG. 7 or of a parallel to serial conversion formal circuit.

DETAILED DESCRIPTION OF THE FIGURES

Figure 1:
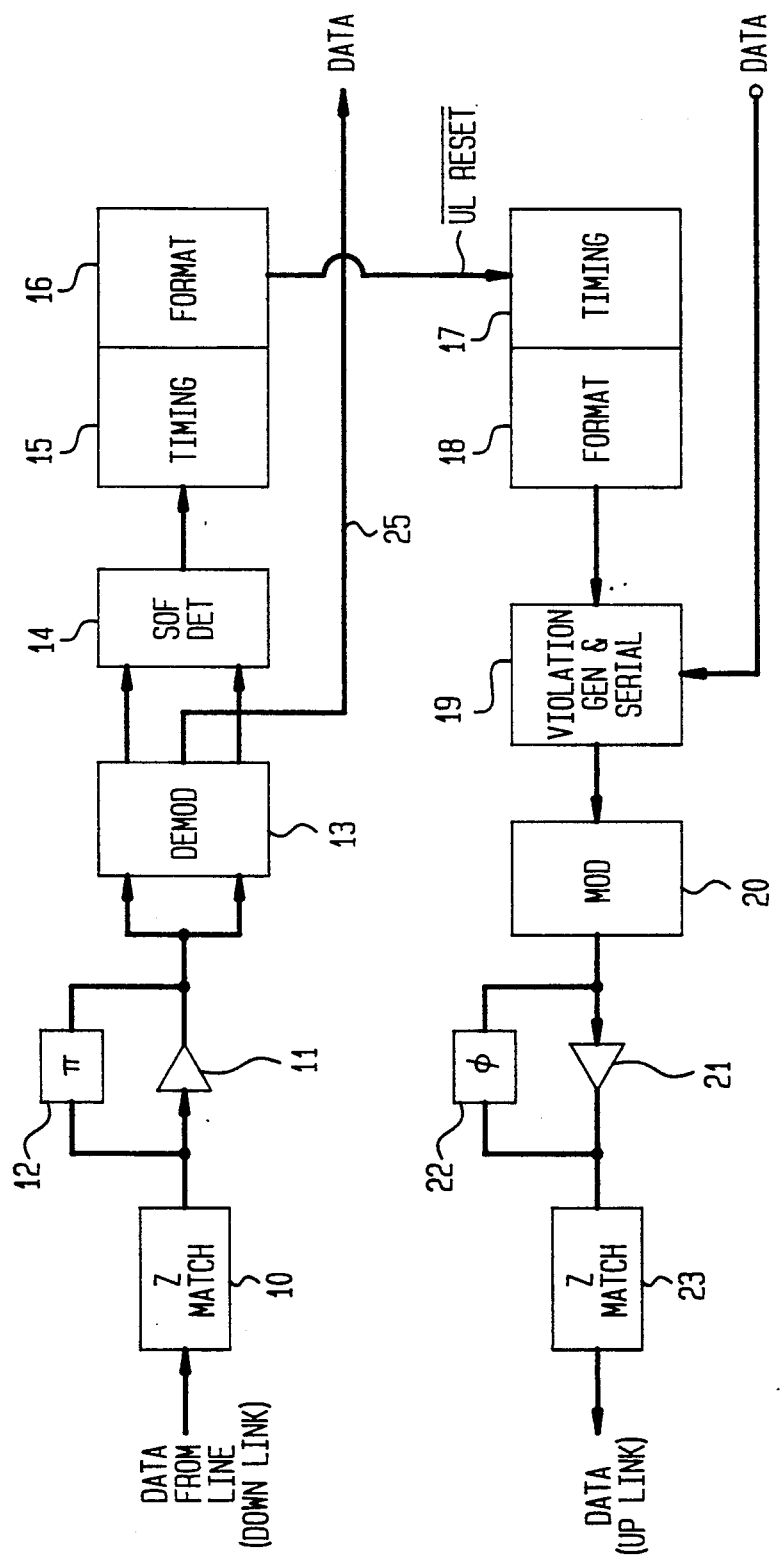
FIG. 1 is a block diagram showing a down link data path coupled to an up link data path depicting a digital phased lock loop (DPLL) according to this invention.

Referring to FIG. 1, there is shown the major components of both the up-link and down-link circuits associated with a typical telephone subscriber line. Essentially, the circuit shown in FIG. 1 is a digital phased lock loop, as will be further explained. With reference to FIG. 1 it is again noted that each line or each communications path utilized in a telephone network employing AMI signalling has an up-link and a down-link side. Received data from the telephone line or from the down-link side, is first applied to the input of an impedance matching device 10 which may be a hybrid or transformer or other device, as is well known. The device 10 provides isolation and protection of the line as is known. The output of the impedance matching device 10 is applied to the input of an operational amplifier 11 having a specified feedback network designated by reference numeral 12 and is also understood in the prior art. The output of the operational amplifier 11 is applied to the input of a demodulator 13. The function of a demodulator is to demodulate the incoming data according to the AMI code and provide output data on line 25. The output of the demodulator goes to the input of a "Start of Frame" detector 14 (SOF DET). The output of the "Start of Frame" (SOF) detector is applied to a timing and format circuit designated by reference numerals 15 and 16. As will be explained, the circuits 15 and 16 provide proper timing and data format enabling the up-link circuit to be locked to the down-link circuit.

As seen in FIG. 1, an up-link circuit applies or transmits data to the telephone line. The up-link circuit consists of a timing and format module designated respectively as 17 and 18, with the output of the format module 16 of the down-link circuit coupled to the input of the timing module 17 associated with the up-link circuit. The down link format circuit 16 provides a signal designated as UL reset which synchronizes the timing circuitry 17 of the up link circuit. The output of the format and timing block is applied to the input of a violation generator and serializer 19 which essentially provides both the serial data format and provides the violations necessary to indicate the "Start of Frame" signal. The output of the generator 19 is applied to the input of a modulator 20 where it is converted, again, to the proper AMI signal. The output of the modulator is applied to an operational amplifier 21 having a feedback network 22. The output of the operational amplifier 21 is applied to the input of an impedance matching network 23 whose output is coupled to the telephone line to provide up-link data to the line.

FIG. 2 shows a series of waveforms which will be employed in explaining the operation of the present invention.

As indicated, frames in a bipolar transmission system as in an AMI system or, for example, a Manchester system are delineated by violating a characteristic of the modulation or the encoding. A violation in AMI modulation occurs when the polarity of the pulses remains the same for two or more pulses in succession. Frames in the AMI system are at fixed length and, for example, each frame may consist of 20 bits. The polarity of the violation varies based on the number of "1" bits contained in the frame. Therefore, it is necessary to test the status of the incoming data as a function of the data's polarity. In addition, it is necessary to insure that the information to be tested is valid. A method of validation is to test the duration of the incoming data.

Figure 2A:
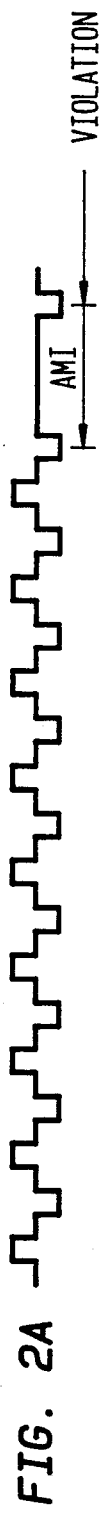
FIG. 2 consists of FIG. 2A to FIG. 2G, constituting a series of waveforms necessary to explain the operation of the invention.

Referring to FIG. 2A, there is shown a typical AMI signal. FIG. 2A depicts the AMI signal of 20 bits which constitutes one frame. As one can see, the 17th bit is an inverted signal or a "1" and then the 18th and 19th bits are at the "0" reference level or binary "0" with the 20th bit also being a "1" but having a negative polarity and the same as the 17th bit. Thus as one can see, there is an encoding violation as successive "1's" are always of alternate polarity. Hence, two successive negative pulses cannot occur. Therefore, the waveform of FIG. 2A shows a violation between the 17th and 20h bits because the polarity of the pulses remains the same for the configuration shown in FIG. 2A.

Figure 2B:
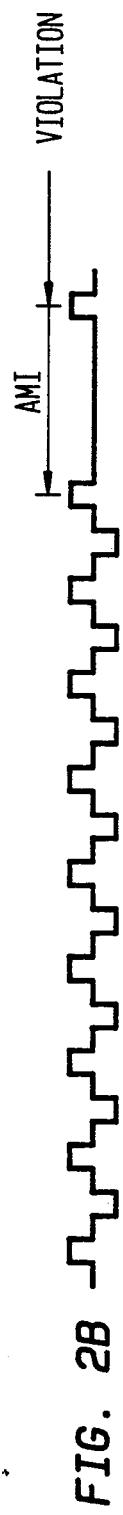

Referring to FIG. 2B, there is again shown a frame of an incoming AMI signal. In FIG. 2B the 16th bit is positive and is then followed by another positive bit for the 20th bit, with bits 17, 18, and 19 being at the "0" voltage or reference potential. Again, the waveform of FIG. 2B shows an improper AMI transition where the polarity of the pulses, namely the 16th and the 20th pulse, remains the same in succession. This also constitutes a violation in encoding, which can be used to determine the "Start of Frame" (SOF).

Figure 2C:
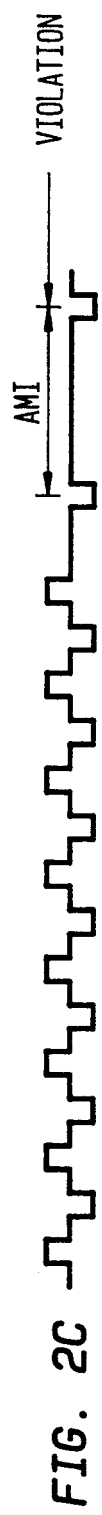

Referring to FIG. 2C, there is shown still another violation where another frame of 20 bits is shown. In FIG. 2C it is seen that the 16th bit and the 20th bit are both negative, with bits 17, 18, and 19 being at the "0" level, hence giving another violation which violation can also determine the "Start of Frame" (SOF) signal.

Figure 2D:
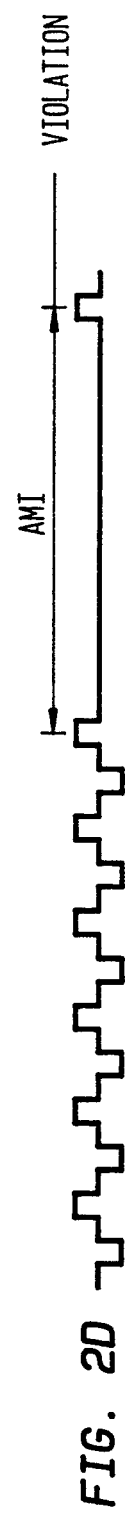

FIG. 2D shows a violation existing again in regard to bits 12 and 20 which are the same polarity level and not of alternate polarity as required by the system's encoding.

Figure 2E:

Referring to FIG. 2E, there is shown a data signal designated as P_DATA. As one can see, the P_DATA signal represents positive polarity data bits which exist on the AMI signal. The P_DATA signal of FIG. 2E corresponds to the AMI transmission as shown in FIG. 2D. Therefore, for each positive pulse of FIG. 2D there is a positive pulse in FIG. 2E of the same duration.

Figure 2F:
Figure 2G:
Figure 3:
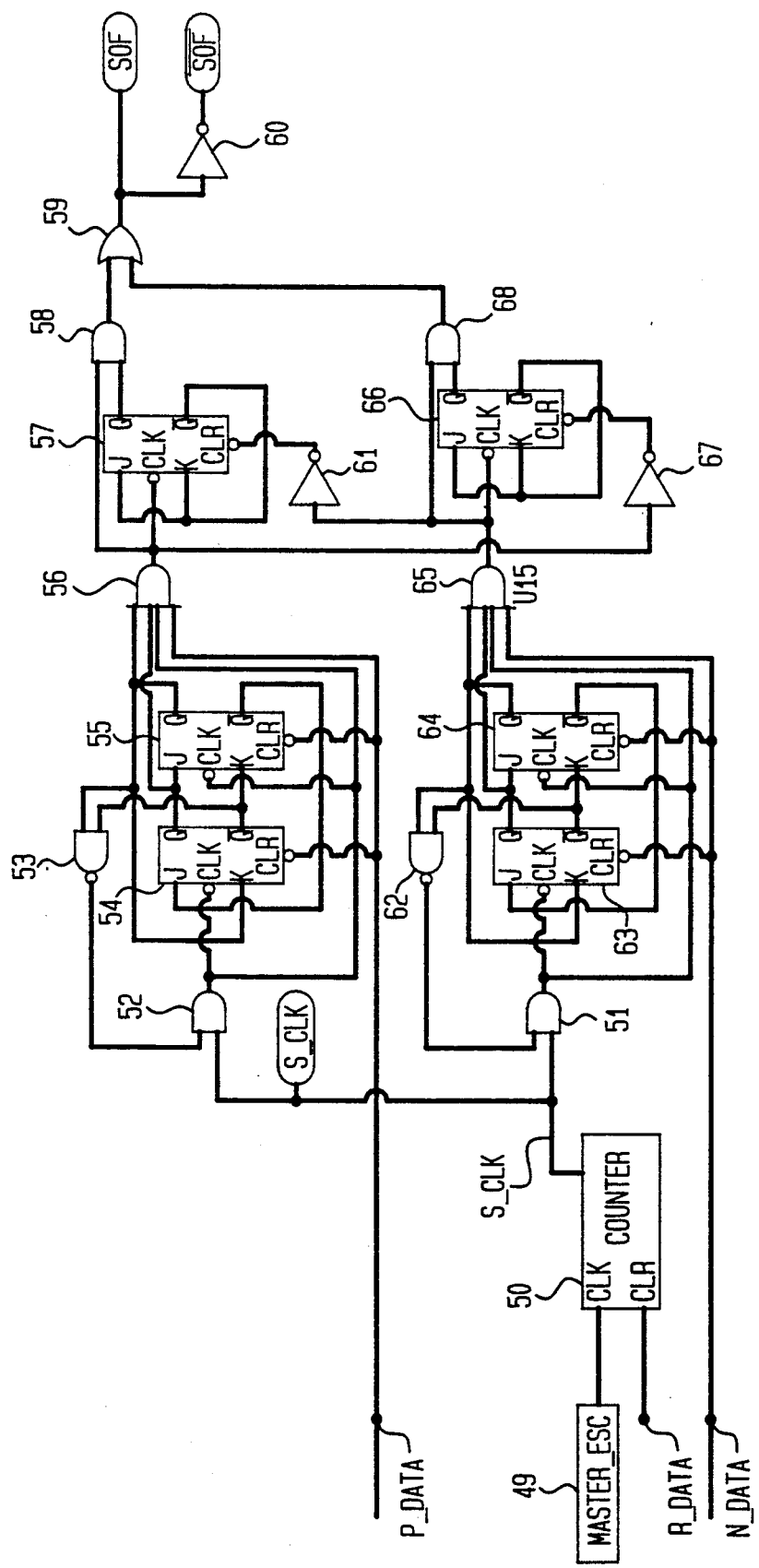
FIG. 3 is a detailed block diagram of a frame detection circuit useful in implementing this invention.

FIG. 2F represents an N_DATA signal. As one can see from FIG. 2F, the signal N_DATA represents negative polarity data taken from the bipolar encoded transmission system waveform (AMI) of FIG. 2D. The N_DATA signal provides a positive pulse for each negative pulse of the AMI signal of FIG. 1D. The P_DATA signal and the N_DATA signal are combined in an OR gate or similar gate to form the signals shown in FIG. 2G. This is known as the R_DATA. As one can see, the R_DATA signal contains the ORed combination of P_DATA N_DATA. This aspect is explained in the above-noted copending applications. In order to obtain synchronization, it is necessary to test the data to insure that it is valid data. A method of validation is to test the duration of incoming logical "1's". A circuit for doing this is shown in FIG. 3, which circuit provides a means of testing for duration and both polarities. In addition to determining if an incoming bit has been true for a specified period of time, if two or more consecutive bits have been received, that are of the same polarity, SOF is developed from the detection of these two bits. This signal, which is the SOF output, is then applied to the timing circuitry, as will be explained. The circuit of FIG. 3 operates as follows.

As above indicated, a violation in AMI modulation occurs when the polarity of the pulses remains the same for two or more pulses in succession and as shown as violations for the signals shown in FIGS. 2A to FIG. 2D. Frames are of a fixed length as, for example, 20 bits. The polarity of the violation varies based on the number of "1" bits contained in the frame. Therefore it is necessary to test the status of the incoming data as a function of the data's polarity. In addition, it is necessary to insure that the information to be tested is valid. A method of validation is to test the duration of incoming data. Thus the circuitry shown in FIG. 3 provides a means of testing the data both for duration and polarity of the data. As seen in FIG. 3, the R_DATA signal (FIG. 2G) is applied to the clear input of a counter 50. The counter receives a master oscillator signal at the clock input. This frequency is selected to be much higher than the AMI rate of 160 ml/sec and, for example, can be 10 Mhz or greater. In this manner the counter 50 is used as a frequency divider and may provide a division by a suitable factor. The output of the counter is a signal designated as S_CLK which signal off until the R_DATA goes true. The S_CLK frequency is such that three clock counts will be reached in about 50% of the true period of the incoming data. If reference is made to FIG. 4A, there is shown a P_DATA signal which constitutes a half of a bit cell duration. FIG. 4B shows the S_CLK signal. It is seen that the S_CLK signal provides 6 pulses during the duration of the half bit cell or P_DATA signal. The P_DATA signal is applied to the clear (CLR) inputs of flip-flops 54 and 55 and is also applied to one input of AND gate 56. The flip-flops 54 and 55 are JK flip-flops. It is understood that other configurations could be employed as well. As seen in FIG. 3, flip-flops 54 and 55 are configured as a "Johnson" or ring counter. This type of counter provides a gray code counting method whereby one stage changes state at each S_CLK input avoiding timing generated noise glitches. Thus as seen, the input to the counter which is the clock (CLK) inputs of the JK flip-flops 54 and 55 is obtained from the AND gate 52 having the S_CLK signal applied to one input Another AND gate 53 has one input coupled to the Q output of flip-flop 54 and one input coupled to the Q output of flip-flop 55. The purpose of gate 53 is to decode an output count of three from the counter. The output of gate 53 is coupled to the other input of AND gate 52. Thus when the output from AND gate 53 is high, this disables AND gate 52 and therefore prevents any further S_CLK signals from being applied to the counter consisting of JK flip-flops 54 and 55. If P_DATA goes false prior to a count of three, the ring counter is held to its cleared position until the data goes true again. In this manner the counter is held to all zeros if the P_DATA signal goes false prior to a count of three. In addition, the R_DATA signal will also go false resetting counter 50. As will be further seen, this operation eventually causes the signal at the output of gates 60 and 59 which is the start of frame (SOF) signal to fall very near the middle of the true period of the incoming data. The output signal from gate 59 is the start of frame (SOF) signal or a code violation signal and the output from inverter 60 is the inverse signal (SOF). As one can see, the Q outputs from flip-flops 54 and 55 are applied to a separate input of AND gate 56. AND gate 56 as indicated has four inputs. A first input to AND gate 56 is the P_DATA signal. A second input to AND gate 56 is the output from gate 52 which is the S_CLK. A third input to AND gate 56 is the Q output of flip-flop 54 and the fourth input to AND gate 56 is the Q output of flip-flop 55. The waveform at the output of AND gate 56 is shown in FIG. 4E. The Q output of flip-flop 54 is shown in FIG. 4C while the Q output of flip-flop 55 is shown in FIG. 4D. As seen AND gate 56 provides an output when counters 54 and 55 reach the count of three (1,1) and the S_CLK and P_DATA are "true" or at logic "1". Thus the output of gate 56 is positive if the data applied to the input remains true for a minimum of three counts. The Q output of JK flip-flop 57 is toggle true at the trailing edge of S_CLK. This is shown in FIG. 4F which represents the Q output of flip-flop 57. The output of gate 56 is applied to the clock input (CLK) of flip-flop 57. The Q output of flip-flop 57 is applied to one input of AND gate 58 with the other input of AND gate 58 applied to the output of AND gate 56. The output of AND gate 58 is applied to one input of the OR gate 59. The output of OR gate 59 is the start of frame (SOF) signal or a code violation signal. The output of gate 59 is also applied to an inverter 60 to produce the negative or the SOF signal. As seen, the Q output of flip-flop 57 is applied to its own J and K inputs to prevent it from toggling once the Q output has gone false. The Q output of flip-flop 57 partially enables the AND gate 58. If the next incoming mark is the same polarity, while the Q output of flip-flop 57 is true, then the AND gate 58 is completely enabled for the duration of the positive period of the third $S_{13}$ CLK. In this manner the SOF output of gate 59 will be generated both at the output of gate 59 and at the output of inverter 60, respectively. As one can see, the above-noted discussion concentrated upon circuit operation for the P_DATA signal. Essentially the N_DATA signal (FIG. 2F) operation is implemented in the same exact manner. Thus the S_CLK is again applied via gate 51 to the clock inputs of flip-flop 63 and 64 arranged in the same counting configurations as flip-flops 54 and 55. The N_DATA signal is applied to the clear inputs of flip-flop 63 and 64. The flip-flops 63 and 64 have the count of 3 monitored by gate 62 which has its output coupled to one input of gate 51 thereby disabling the same as above described for gates 52 and 53. The AND gate 65 has four inputs as gate 56 and operates in the same manner. In this manner AND gate 65 has a first input which is the Q output of flip-flop 54, a second input which is the Q output of flip-flop 63, a third input which is the output of gate 51 and a fourth input which is the N_DATA input. The output of gate 65 is coupled to the clock input (CLK) of the toggle flip-flop 56 which operates in the same manner as flip-flop 57. The Q output of flip-flop 56 is coupled to one input of AND gate 68. The other input of gate 68 is coupled to the output of gate 65. The output of gate 68 is also coupled to the other input of NOR gate 59 to generate an SOF signal for N_DATA signal violations or negative pulse violations of the AMI signal. It is seen that inverters 61 and 67 operate to clear flip-flops 66 and 57 when P_ or N_DATA is controlling. Thus as seen, the above-noted circuit operates as the same way as the P_DATA circuit except that the operation of, for example, the circuit containing counters 63 and 64 is for N_DATA. Thus when consecutive marks or true periods are of the opposite polarity, flip-flops 57 and 66 are cleared. Assume now that flip-flop 57 has been set true by a P_DATA mark. If the next true is generated from N_DATA, the output of inverter 61 will go false clearing flip-flop 57, leaving the Q output from flip-flop 56 true. If the next mark is generated by P_DATA, the output of inverter 67 will go false, clearing flip-flop 56. Therefore no SOF signal is generated. As an example, the period of an AMI bit cell at 160 kilobits per second is 6.250 microseconds. A logic "1" or mark condition is signified by the level remaining high for the first half of the cell period which is 3.125 microseconds. The objective is to have the third clock pulse fall in the center of this true period or about 1.56 microseconds into the period. Dividing the output of a 16 MHZ oscillator to 1.6 Mhz will cause this to occur. The SOF pulse will be 0.3125 microseconds wide. A narrow SOF pulse is beneficial if it is used as for example in a digital phase lock loop (DPLL). Wide pulses may hold counters and the like reset while the pulse is true. Thus, the circuit of FIG. 3 operates to do so.

Figure 4A:
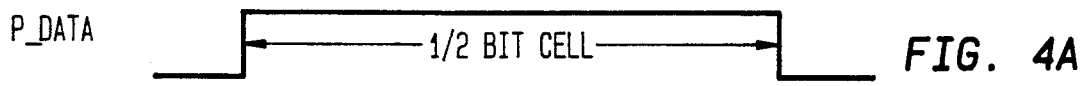
FIG. 4 consists of FIG. 4A to FIG. 4G, constituting a series of waveforms necessary to explain the operation of FIG. 3.
Figure 4B:
Figure 4C:
Figure 4D:
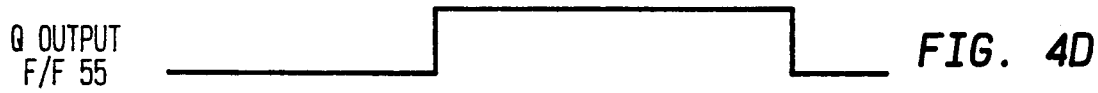
Figure 4E:
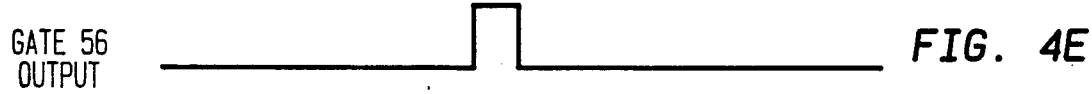
Figure 4F:
Figure 4G:

FIG. 4A shows the typical one-half cell bit or the pulse duration for a P_ or N_DATA signal. FIG. 4B shows the S_CLK signal. As one can see, there are six S_CLK pulses within the P_ or N_DATA pulse duration. This divides the duration by six. The number six is arbitrary and a greater or lesser number can be used. FIG. 4C shows the output of flip-flop 54. FIG. 4D shows the output of flip-flop 55. FIG. 4E shows the output of gate 56, and FIG. 4F shows the output of flip-flop 57. FIG. 4G shows the output of the oscillator to be described and used for timing anf formating.

Figure 5A:
FIG. 5 consists of FIGS. 5A to FIG. 5F are series of waveforms necessary to explain the operation of this invention.
Figure 5B:
Figure 5C:
Figure 5D:
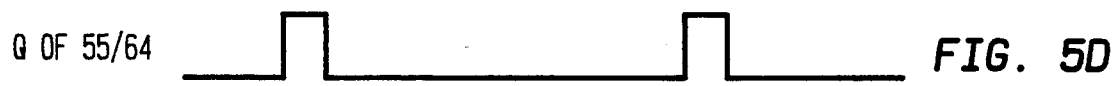
Figure 5E:

Referring to FIG. 5, there is shown the above-noted data at a different scale where FIG. 5A shows a typical P_DATA signal showing two pulses. FIG. 5B shows the nature of the S_CLK signal. FIG. 5C shows the output of flip-flops 55 and/or 64. FIG. 5E shows the output of gates 56 and/or 65. FIG. 5F shows the output of OR gate 59. Thus, as one can understand, the above-described circuit tests the duration of the incoming bit to separate real data from noise pulses. The circuit operates to generate a narrow output pulse at the center of the true period of the bit cells reducing jitter and wandering while generating the narrow output pulse (SOF) which can control a digital phased lock loop. The count used to determine the true period of the bit can be increased such that the higher the count, the closer the output pulse will be to the center of the true period. The circuit operates to completely reset and start from zero if it is activated by noise pulses. The circuit as described above, operates to detect modulation errors by generating more or less frequent SOF outputs.

Figure 5F:
Figure 6:
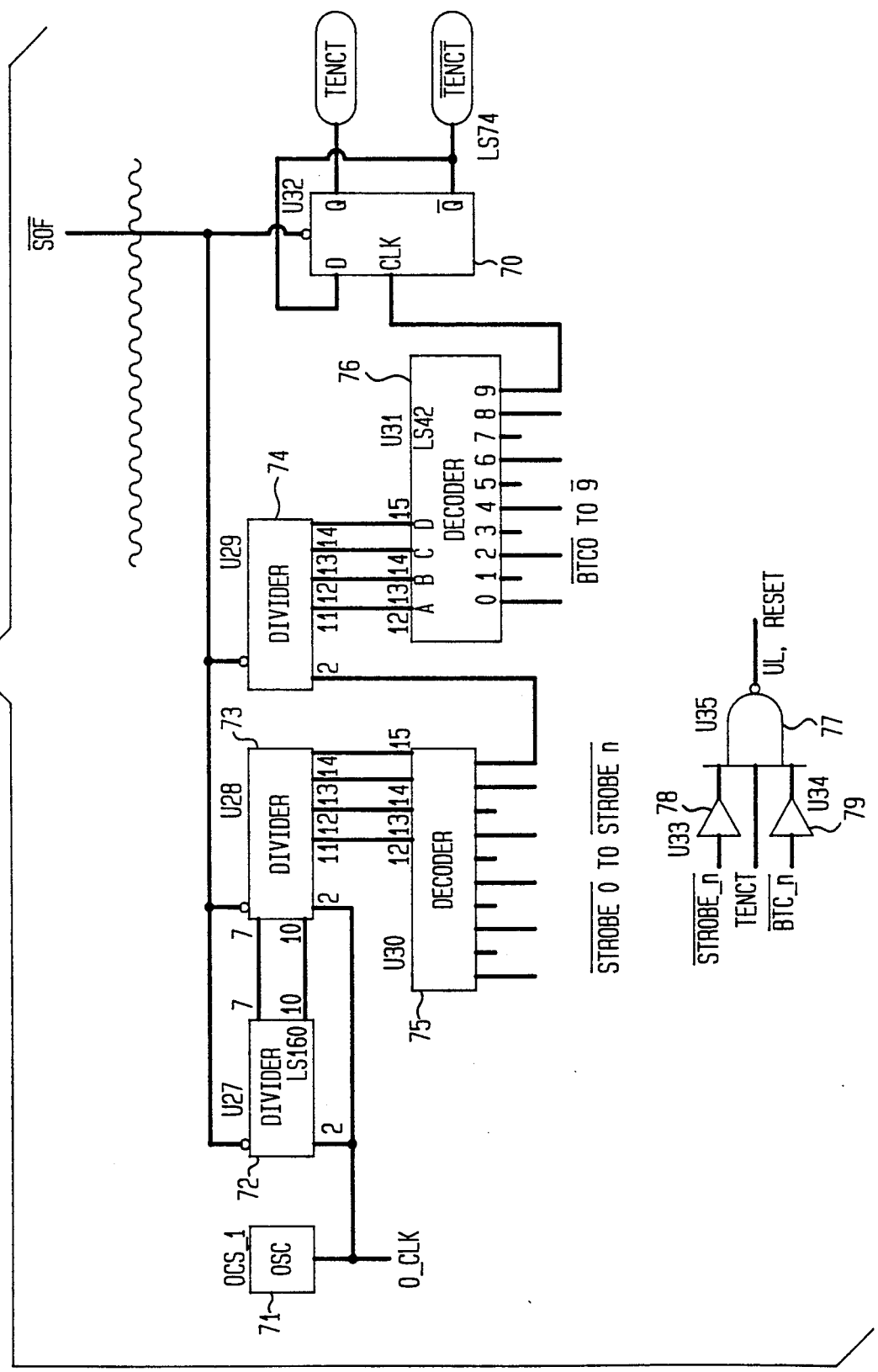
FIG. 6 is a detailed block diagram of a timing circuit according to this invention.

Thus as one can see, the $\overline{SOF}$ signal developed by the circuitry shown in FIG. 3 at the output of gate 59 is applied to the reset input of a DQ flip-flop 70 of FIG. 6. The flip-flop 70 as will be explained produces two outputs designated as TEN CT and $\overline{TEN\_CT}$. The application of the $\overline{SOF}$ signal to the circuit shown in FIG. 6 causes the timing to re-synchronize with the incoming data. To insure that the up-link timing will match the down-link side and therefore the host timing, a decoding circuit is shown in FIG. 6 and will generate a pulse similar to the SOF pulse to cause the up-link side to be resynched. As shown in FIG. 1 the UL RESET output from the format circuit 16 on the down-link side is applied to an input of the timing module 17 associated with the up-link side. The signal applied from format circuit 16 is the UL reset signal which, as will be explained, is generated by the circuitry shown in FIG. 6. Shown in FIG. 6 is an oscillator 71 which is a conventional crystal oscillator and which does not have to be temperature stabilized. The waveform for oscillator 71 is shown in FIG. 4G. The output of the oscillator 71 is then divided in frequency by a series of dividers 72 and 73 whereby dividers 72 and 73 operate to divide the frequency of the oscillator. The output of the divider 73 is applied to the inputs of a decoder 75 which produces from the oscillator signal strobe signals as $\overline{STROBE_{13}0}$ to $\overline{STROBE_{12}n}$, as will be explained. The output of decoder 75 is applied to still another divider 74. The output of divider 74 is applied to decoder 76 which produces at its output signals designated as $\overline{BTC\_0}$ to $\overline{BTC_{13}9}$. The $\overline{BTC\_9}$ output of decoder 76 is applied to the clock input of the DQ flip-flop 70 which receives the $\overline{SOF}$ signal at the reset input. The $\overline{SOF}$ signal is also applied to the resets of dividers 72, 73, and 74. As will be explained, the circuitry shown in FIG. 6 operates in conjunction with the circuitry shown in FIG. 7 to form the timing and format generator. As one can see from FIG. 5, the SOF signal of FIG. 5F is very close to the center of a bit period as shown in FIG. 5A as R_DATA. This signal as indicated is applied to the reset of dividers 72, 73, and 74 and also applied to the reset input of the DQ flip-flop 70. When this occurs, the zero outputs from the decoders 75 and 76 are true. This causes the BTC-n (bit count output) to coincide with the incoming bit period. Based on this timing relationship, the trailing edge of strobe #7 is used to clock divider 74. The timing waveforms as produced by the circuit of FIG. 6 and also used in conjunction with the circuitry of FIG. 7 are shown in detail in FIG. 8. As one can ascertain, the start of frame pulse is shown in FIG. 8. The bit 20 output which will be explained is shown in FIG. 8A. The strobes developed by the decoder 75 which are basically $\overline{STROBES\_0\text{-}7}$ but can be $\overline{STROBES\_0\text{-}n}$ as shown in FIGS. 8B-8I. The outputs which are $\overline{BTC\_0}$ and $\overline{BTC\_1}$ are shown in FIGS. 8J and 8K. One can ascertain based on the above-noted frequencies, that the worst case shift from the center of the SOF pulse will be the period of the output from oscillator 71 or 62.5 nanoseconds. Thus the oscillator 71 of FIG. 6 is the master oscillator whose waveform is also shown in FIG. 4G. The output from oscillator 71 as indicated is divided by dividers 72, 73, and 74. In the previous example the data rate was 160 kilobits per second. The oscillator 71 operates at a frequency of 16 MHZ. If one divides the oscillator 71 by 100 via dividers 72 and 73, and then decodes the output from divider 73 via decoder 75, it can be seen that STROBE #7 of FIG. 8I which is applied to divider 74 will occur at 160 KHZ rate. Thus when STROBE 7 is applied to divider 74, the decoded outputs from decoder 76 are true for a period equal to the length of, and in coincident with, the incoming data. This incoming data is designated as R_DATA in FIG. 7 and is shown, for example, in FIG. 2G. The output from flip-flop 70 is used to extend the count to a full 20 bits when decoded in conjunction with the $\overline{BTC\_n}$ outputs. As indicated previously, 20 bits constitute one frame. One output of flip-flop 70 is designated as ten count (TEN_CT). This output is applied to gate 77 as one input, with STROBE_n via inverter 78 as another input and with the $\overline{BTC\_n}$ as the third input via inverter 39 to produce at the output of gate 17 the up-link reset. The n stands for a positive integer from 1-7. Thus the counter circuitry of FIG. 6 which is on the down-link side is used to accumulate any timing difference between the data source and the data receiver. There is a similar circuit on the up-link side, as will be further explained. After a number of bit periods have passed, the $\overline{STROBE\_n}$ will appear to have moved to the left of the bit cell if the incoming data's clock is slower than the receiver's clock. The STROBE_n will appear to move to the right if the incoming data's clock is faster than the receiver's clock. To be able to accommodate drift in either direction, SOF was placed in the middle of the bit period representing a logical "1" as described above. The periodic resetting of the counters causes the accumulated timing differences to be set to "0". Thus by selecting the strobe as applied to inverter 78, one can now set the timing for a corresponding up-link timing/format generator that may or may not require a shift in time with respect to the incoming data.

Referring to FIG. 7 there is basically shown the format circuitry portion of the timing/format circuitry. The format circuit is indicated in FIG. 1 as FORMAT 16 and 18, respectively, for the down-link and up-link sides of the telephone line. The timing circuits 15 and 17 have been depicted in detail in regard to FIG. 6. Referring to FIG. 7 there is shown the R_DATA signal which essentially is directed to serial to parallel converters 84 and 86. Each of the converters store 8 bits (BYTE) indicative of voice and data and convert the incoming R_DATA signal to parallel signals to be utilized by the system. As one can see, the signals developed by the circuitry in FIG. 6 are applied to the circuitry of FIG. 7. In this manner the DQ flip-flop 80 receives the BIT-1 information as a clock input and receives the TEN CT at the D input with the BIT-0 information at the clear input. The circuitry is arranged as shown in FIG. 7 so that the DQ flip-flops 80 and 81 operate in conjunction with gates 82 and 83 to properly gate the serial to parallel converters 84 and 86 according to the timing requirements. Also seen are AND gates 85 and 87 which produce the voice interrupt signals as well as the data interrupt signals. These signals are well known in the art and are referred to in FIG. 7 as V_IRQ and D_IRQ. These signals are utilized in such systems to notify the system when the respective buffers 84 and 86 are filled so that the data can be removed from each of the buffers and new data inserted therein.

Referring to FIG. 9 there is shown a timing example indicating an arbitrary case. FIG. 9D shows the gate configuration depicted in FIG. 6 with NAND gate 17 which can receive at an input via inverter 78 any of the strobes indicated in FIG. 6 which emanate from the decoder 75. In a similar manner, the BTC signal can be applied to inverter 79 from any of the decodes from decoder 76. The third input is derived from the output of the DQ flip-flop 70 and one uses one output as the Q output for bits 0-9 and employs the inverted output for bits 10-19. FIG. 9D shows the bit numbers 0-19 in a frame. The Start of Frame ($\overline{SOF}$) signal is shown in 9E and the UL reset signal in 9F. FIG. 9G shows how the UL reset signal is used to generate the up-link timing as for example in regard to $\overline{BTC\_0}$ and $\overline{BTC\_1}$. FIG. 9A shows $\overline{BTC\_n}$. $\overline{STROBE\_7}$ shown in FIG. 9B and $\overline{STROBE\_0}$ in FIG. 9C. Thus from FIG. 9 one can determine the exact timing available in conjunction with the above-noted system. If one evaluates the shift of the clock edge, one can determine that a significant difference in clock frequencies can exist between the host and the remote device. In this manner the circuit allows for the use of a single crystal oscillator which does not have to be temperature compensated. After the single frame has passed, that is a SOF signal has been generated, the two systems are immediately locked together due to the nature of the circuitry.

Figure 10:
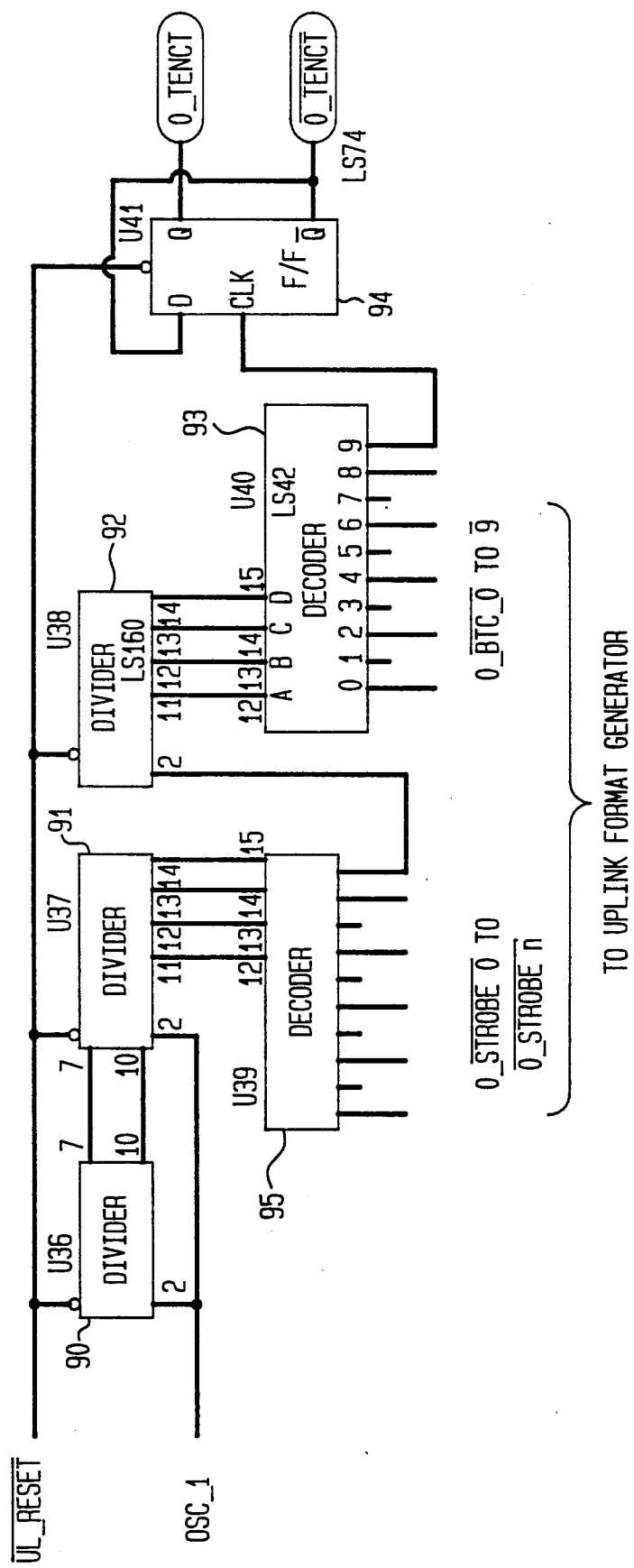
FIG. 10 is a block diagram showing a timing circuit as, for example, the circuit depicted in FIG. 6 and used on the up link side of the system.

Referring to FIG. 10 there is shown the timing generator 17 associated with the up-link section of FIG. 1. As one can see, the timing generator 17 is exactly like the timing generator 15 with the exception that the UL RESET signal is applied to the reset inputs of dividers 90, 91, and 92. Divider 91 is associated with decoder 95 while divider 92 is associated with decoder 93. The DQ flip-flop 94 also receives the $\overline{UL\ RESET}$ signal to produce the TEN COUNT and outputs as indicated. The outputs of the strobes go to an exact circuit as shown in FIG. 7 which thereby generates the data according to the format shown in FIG. 7 so that the data is now applied to the modulator 20 in proper form. Thus to insure that the up-link timing will match the down-link timing and therefore the host timing, the decoding circuit shown in FIG. 6 is again employed in FIG. 10 with timing diagrams as indicated, and is used to generate a pulse similar to the SOF pulse to cause the up-link side to be resynched. Thus as one can also understand, the narrow SOF pulse is beneficial for use in this particular phased lock loop. A wide pulse will hold counters and other components reset while the pulse is true. This condition creates additional jitter and skews the timing towards one end or the other end of each incoming bit cell. In this manner the narrow SOF pulse employed herein is applied to a set of counters along with the circuitry and forms a very stable format generator. Thus the circuit above described produces a narrow output pulse in the center of the logical "1" period of bit cells reducing jitter and wandering. The count is used to determine the true period of a bit and can be increased such that the higher the count, the closer the output pulse will be to the center of the true period. The circuit is completely reset and starts from "0" upon the activation of noise pulses. As one can see, transmission errors can be detected by using the counter to test for coincidence between SOF and the proper bit count.

The above-described digital phased lock loop helps reduce jitter and wander. The accumulated difference is summed in the counter until so much data has passed. Once this point is reached, the system is reset always by the SOF pulse. The resumption of operation is always relative to one edge of the data train, thus related to the clock source. The above-described circuit provides a means to lock the slave timing to the data source in a single frame and requires only a conventional crystal oscillator instead of one that is temperature stabilized.

I claim:

1. Apparatus for synchronizing bipolar data on a down link side of a transmission line with bipolar data on an up link side of said transmission line, said bipolar data contained in a bipolar signal, comprising:
    means responsive to said data on said down link to detect a code violation in said bipolar data indicative of a Start of Frame (SOF) signal;
    oscillator means for generating a reference frequency;
    means responsive to said reference frequency and said SOF signal to generate a plurality of timing signals having an accuracy according to said oscillator means and synchronized to said SOF signal, including means responsive to a selected one of said plurality of timing signals for accumulating a time difference between said up link and down link data; and
    means for adjusting said up link data according to said difference to synchronize said up link data to said down link data.

2. The apparatus according to claim 1, wherein said means to detect a code violation comprises:
    clock means for providing an output clock signal of a frequency greater than the frequency of said bipolar signal;
    counting means responsive to said bipolar signal to count a predetermined number of one polarity level of said bipolar signal with respect to said clock means to provide an output signal when said one polarity level does not change to another polarity level subsequent to obtaining a count of said predetermined number; and
    means responsive to said output signal from said counting means and to said bipolar signal to detect a violation in said bipolar signal whereby said violation is indicative of said one polarity level followed by another said one polarity level in succession indicative of said SOF signal.

3. The apparatus according to claim 2, wherein said bipolar signal is an alternate mark inversion (AMI) signal.

4. The apparatus according to claim 3, wherein said one polarity level is the positive level (P_DATA) of said AMI signal.

5. The apparatus according to claim 4, wherein said one polarity level is the negative level (N_DATA) of said AMI signal.

6. The apparatus according to claim 1, wherein said means responsive to said reference frequency and said SOF signal includes divider means for dividing said reference frequency by a given amount as synchronized by said SOF signal.

7. The apparatus according to claim 6, further including decoding means for decoding said divided frequencies to provide said plurality of timing signals.

8. The apparatus according to claim 7, further including gate means responsive to said timing signals selected to provide a format signal indicative of the timer difference between said data.

9. The apparatus according to claim 8, further including format means responsive to said format signal and said data signal to provide at an output a retimed data signal according to said format signal.

10. The apparatus according to claim 1, wherein said oscillator means includes a crystal oscillator operating at 16 MHZ.

11. Apparatus for synchronizing an up link side of a transmission path with a down link side of said transmission path, said transmission path accommodating bipolar data wherein one binary state is alternately encoded with positive and negative polarity pulses, each pulse of a given duration and the other binary state is encoded with a zero or reference level and wherein a violation of said encoding occurs when the polarity level of said pulses remains the same for two or more successive pulses wherein said violation may constitute a Start of Frame (SOF) signal, comprising:
    means responsive to said data on said down link side for detecting said violation indicative of said SOF signal;
    means responsive to said SOF signal for generating a plurality of timing signals synchronized to said SOF signal but delayed one from the other by a specified duration;
    means operative to select one of said timing signal, including means responsive to a selected one of said timing signals to generate a new signal corresponding to said SOF signal; and
    means coupled to said up link side and responsive to said new signal to synchronize data on said up link side to said new signal.

12. The apparatus according to claim 11, wherein said bipolar signal is an alternate mark inversion (AMI) signal.

13. The apparatus according to claim 12, wherein said means for generating a plurality of timing signals includes:
    reference oscillator means responsive to said SOF signal including dividing means for providing a plurality of output divided oscillator frequency signal synchronized to said SOF signal; and
    decoding means responsive to said divided oscillator frequency signals to provide said plurality of timing signals.

14. The apparatus according to claim 13, further including:

format means responsive to said timing signals and said data signal on said down link line to provide a new data signal synchronized to a said selected one of said timing signals and therefore to said SOF signal.

15. The apparatus according to claim 11, wherein said means responsive to data on said down link side includes:

means for generating a first signal (P_DATA) indicative of positive polarity data of said bipolar signal, a second signal (N_DATA) indicative of negative polarity data of said bipolar signal, and a third signal (R_DATA) indicative of both negative and positive polarity data, with each of said signals having pulses of the same duration.

16. The apparatus according to claim 15, wherein said means coupled to said up link side synchronizes said data according to said third signal.

17. The apparatus according to claim 13, wherein said reference oscillator is a crystal oscillator operating at a frequency of 16 HZ.

18. The apparatus according to claim 11, wherein said transmission path is a telephone line.

19. The apparatus according to claim 11, wherein each pulse has a given pulse duration, wherein said means for detecting said violation comprises:

means responsive to said bipolar signal to provide a first series of pulses indicative of said positive pulses and a second series of pulses indicative of said negative pulses, clock means operative to provide a high frequency clock output providing a predetermined number of pulses for each of said pulse durations, counting means responsive to said clock output and said first and second series of pulses to count to a predetermined number of said pulse durations to provide a third series of pulses corresponding to true negative pulses, by said counting means providing said third and fourth series of pulses relatively about the center of said pulse duration for each polarity, logic means responsive to said third and fourth series of pulses and said first and second series of pulses to provide an output signal (SOF) when at least two successive pulses indicative of said bipolar signal have the same polarity manifesting a code violation.

20. The apparatus according to claim 12, wherein said AMI signal has 20 bits in each frame.

21. The apparatus according to claim 20, wherein said bits can be data bits or voice bits.

* * * * *